April 13, 1971        P. T. GODESIABOIS        3,574,533
METHOD OF PREPARING BERYLLIUM NITRATE SOLUTIONS
Filed May 13, 1969
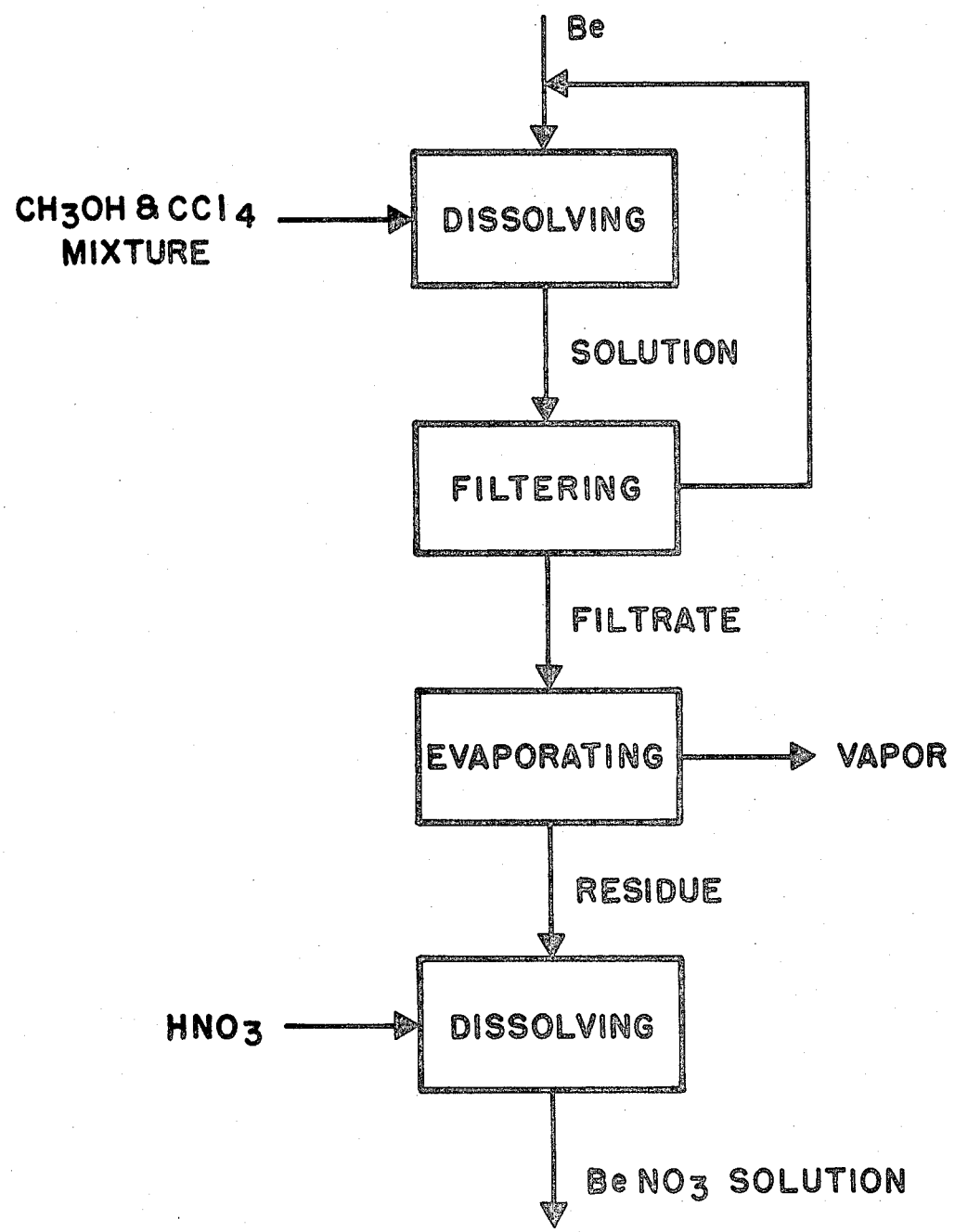
INVENTOR.
PAUL T. GODESIABOIS
BY

United States Patent Office 3,574,533
Patented Apr. 13, 1971

3,574,533
METHOD OF PREPARING BERYLLIUM NITRATE SOLUTIONS
Paul T. Godesiabois, Boulder, Colo., assignor to the United States of America as represented by the United States Atomic Energy Commission
Filed May 13, 1969, Ser. No. 824,207
Int. Cl. *C01f 3/00*
U.S. Cl. 23—102                5 Claims

ABSTRACT OF THE DISCLOSURE

A method for obtaining beryllium nitrate solutions comprising first dissolving beryllium in a methyl alcohol-carbon tetrachloride mixture, filtering the resulting solution, evaporating the filtrate to a dry residue, and dissolving the residue in nitric acid.

BACKGROUND OF INVENTION

Beryllium nitrate solutions have many uses in the laboratory and in industry. One such use for these solutions is to produce beryllium nitrate itself, which in turn may be used to harden another material and for other purposes. Other uses of the solutions include its use with alpha emitting radioactive materials like plutonium in solution therewith as a neutron source, its use as a convenient neutron moderator or reflector where it may be difficult or expensive to fabricate a solid beryllium member and its use as a general laboratory tool. In many or all of these uses, highly concentrated and even saturated beryllium nitrate solutions would be desirable. For example, in its use as a neutron source, the concentration and amount of beryllium available may be a limiting factor on the number of neutrons generated.

Prior methods of forming beryllium nitrate solutions, for instance by dissolving beryllium in nitric acid to form nitrate solution, were extremely slow.

SUMMARY OF INVENTION

It is an object of this invention to provide a novel method for rapidly producing beryllium nitrate solutions at room temperature.

It is a further object of this invention to provide a method for producing saturated beryllium nitrate solutions.

Various other objects and advantages will appear from the following description of the invention, and the most novel features will be particularly pointed out in connection with the appended claims.

The invention comprises dissolving beryllium in a methanol-carbon tetrachloride mixture, evaporating the resulting solution to a dry residue and then dissolving the residue in nitric acid.

DESCRIPTION OF DRAWING

The drawing shows a flow diagram illustrating the method of this invention.

DETAILED DESCRIPTION

It has been found that beryllium may be more rapidly and readily dissolved by nitric acid if the beryllium is prepared by dissolving the beryllium in a methol alcohol (methanol)-carbon tetrachloride mixture and then evaporate the solution to a dry residue. The residue may then be readily dissolved in nitric acid to form a beryllium nitrate solution at room temperature.

The methanol in the methanol-carbon tetrachloride mixture may vary over a range between about 30 to 70 percent by volume of the mixture. Particularly good results may be achieved with about 60 percent methanol by volume. Other alcohols and solvents in different combinations may be used including such low molecular weight alcohols as butanol, ethanol, isopropanol, and the like and chlorinated hydrocarbon solvents like chloroform, 1,1,1-trichloroethane, 1,1,2-trichloro-1,2,2-trifluoroethane and chlorine.

The nitric acid concentration may be varied from about 6.0 molar to 15.7 molar, generally greater than about 14.0 molar, depending on the desired concentration of beryllium per volume. Concentrations of beryllium as high as about 23 grams of beryllium per liter solutions have been obtained with nitric acid having a concentration as low as 15 molar at room temperature. Concentrations of beryllium as low as desired may also be obtained.

Small pieces of beryllium weighing about 40 grams may be dissolved in about an 800 milliliter 60% methanol-40% carbon tetrachloride mixture. The beryllium may dissolve in about 30 minutes. The solution may then be filtered to remove any remaining particles which may be used in a subsequent methanol-carbon tetrachloride mixture. The filtrate may be allowed to evaporate at room temperature or the evaporation rate may be increased by heating, if desired. The residue, which is in the form of a white powder, may be collected and added to about a 1 liter solution of 15 molar nitric acid at room temperature. Sufficient residue may be added to obtain a saturated solution, or to some desired intermediate level of concentration. The solution may reach saturation in about 15 minutes and may contain about 22 grams of beryllium. With about 10 to 20 grams of plutonium (94% plutonium$_{239}$ and 6% plutonium$_{240}$) added to this solution, neutron rates from about 30,000 to 60,000 neutrons per second may be achieved. By adding about 30 grams of plutonium (same proportions as above) to a 1 liter solution with about 1 gram of beryllium, about 12,000 neutrons per second may be achieved.

This method permits the rapid and ready dissolution of beryllium by nitric acid into a beryllium nitrate solution of high beryllium concentration without heating of the nitric acid above room temperature. This dissolution may be achieved two to fifty times more rapidly than previous methods, and with higher available beryllium concentrations.

It will be understood that various changes in the details and materials, which have been herein described and illustrated in order to explain the nature of the invention, may be made by those skilled in the art within the principles and scope of the invention as expressed in the appended claims.

What is claimed is:
1. A method for obtaining beryllium nitrate solutions comprising dissolving beryllium in a mixture of methyl alcohol and carbon-tetrachloride, filtering the resulting solution to remove undissolved particles and provide a liquid filtrate, evaporating liquid from the filtrate to provide a residue, and dissolving said residue in a nitric acid solution.

2. The method of claim 1 wherein said methyl alcohol is in the range of about 30 volume percent to about 70 volume percent of said mixture.

3. The method of claim 1 wherein said methyl alcohol percent is about 60 volume percent.

4. The method of claim 1 wherein said nitric acid is greater than about 14.0 molar concentrated nitric acid.

5. The method of claim 1 wherein said residue and nitric acid forms a saturated solution of beryllium nitrate.

References Cited

UNITED STATES PATENTS 3,359,064  12/1967  Crouse, Jr. et al. _____ 23—23

OTHER REFERENCES

Alimarin P., et al.; "J. Anal. Chem. U.S.S.R."; vol. 11, 1956, pp. 405–07.

Bureau of Mines Circular 7357, U.S. Dept. of Interior, June 1946.

OSCAR R. VERTIZ, Primary Examiner

G. O. PETERS, Assistant Examiner

U.S. Cl. X.R.

23—22, 23